(12) United States Patent
Okada (10) Patent No.: US 7,041,026 B2
(45) Date of Patent: May 9, 2006

(54) DIFFERENTIAL ASSEMBLY AND TRANSAXLE INCLUDING IT

(76) Inventor: Hideaki Okada, 2-18-1, Inadera, Amagasaki-shi, Hyogo (JP) 661-0981

( * ) Notice: Subject to any disclaimer, the term of this patent is extended or adjusted under 35 U.S.C. 154(b) by 81 days.

(21) Appl. No.: 10/774,449

(22) Filed: Feb. 10, 2004

(65) Prior Publication Data

US 2005/0176549 A1 Aug. 11, 2005

(51) Int. Cl.
*F16H 48/06* (2006.01)

(52) U.S. Cl. .................... 475/221; 475/226; 475/248

(58) Field of Classification Search ............. 475/221, 475/226, 248–252
See application file for complete search history.

(56) References Cited

U.S. PATENT DOCUMENTS

| 2,000,223 | A | * | 5/1935 | Du Pras ..................... 475/226 |
| 2,631,475 | A | | 3/1953 | Gleasman |
| 4,667,535 | A | * | 5/1987 | Knight ....................... 475/226 |
| 4,799,403 | A | | 1/1989 | Dinkel et al. ................ 475/335 |
| 5,147,252 | A | * | 9/1992 | Mace et al. .................. 475/226 |
| 5,169,370 | A | | 12/1992 | Dye et al. |
| 6,325,738 | B1 | * | 12/2001 | Caringella et al. ........... 475/249 |
| 6,575,868 | B1 | * | 6/2003 | Keusch et al. .............. 475/249 |
| 2001/0051557 | A1 | * | 12/2001 | Kawada et al. ............. 475/248 |

FOREIGN PATENT DOCUMENTS

| JP | 02-225843 | 9/1990 |
| JP | 05-079544 | 3/1993 |
| JP | 10-115360 | 5/1998 |

OTHER PUBLICATIONS

English-Language abstract of JP 02-225843.
English-Language abstract of JP 10-115360.
English-Language abstract of JP 05-079544.

* cited by examiner

*Primary Examiner*—Tisha D. Lewis
(74) *Attorney, Agent, or Firm*—Sterne, Kessler, Goldstein & Fox P.L.L.C.

(57) ABSTRACT

A transaxle comprising a transmission, a pair of coaxial axles, a deceleration assembly for decreasing output rotational speed of the transmission, a differential assembly for transmitting power from the deceleration assembly to the pair of axles, and a common housing incorporating the transmission. The differential assembly includes a pair of gear train units disposed on the respective axles, and a bull gear for receiving output rotation of the deceleration assembly. Each of the gear train units includes a sun gear fixed on each of the axles, a holder relatively rotatably provided on each of the axles, and a planetary gear supported by the holder to mesh with the sun gear. The holders of the pair of gear train units are symmetrical with respect to a surface perpendicular to the pair of axles and joined to each other through the surface, and integrally fitted together in the bull common gear.

24 Claims, 8 Drawing Sheets

DIFFERENTIAL ASSEMBLY AND TRANSAXLE INCLUDING IT

BACKGROUND OF THE INVENTION

1. Field of the Invention

The present invention relates to a transaxle provided with a differential assembly having a function of limiting differential rotation of axles.

2. Related Art

As disclosed in Japanese Laid Open Gazette No. Hei 5-79,544, there is a well-known conventional transaxle having an axle casing, in which a transmission, a differential assembly for differentially connecting axles, and a deceleration assembly for transmitting power to the differential assembly are disposed. Especially, the transmission in the disclosed transaxle is a hydrostatic transmission (HST), and the transaxle is named "IHT". The differential assembly in the disclosed transaxle (IHT) is a normal type comprising a bull gear rotatably supported on the axles, a pinion rotatably supported in the bull gear, and side gears fixed on the respective axles to mesh with the pinion.

Generally, minimization, simplification and low cost are desired for such a transaxle. In the above conventional IHT, the deceleration assembly is especially simplified and disposed in a recess formed in the HST so as to reduce the distance between the HST and the differential assembly.

On the other hand, there are various conventional differential assemblies having helical or worm gears to limit differential rotation of axles, as disclosed in Japanese Laid Open Gazette Nos. Hei 2-225,843 and 10-115,360, U.S. Pat. Nos. 2,631,475 and 5,169,370. However, such a differential assembly having the differential-limiting function is so complicated, large and expensive as to make its use prohibitive in assembling a transaxle that is simple, compact and economical.

BRIEF SUMMARY OF THE INVENTION

A main object of the present invention is to provide a transaxle into which a differential assembly can be easily assembled, and which effectively uses a space in a housing of the transaxle so as to simplify and miniaturize a power train in the housing.

To achieve the object, a differential assembly according to the present invention is comprised of a pair of coaxial axles, a pair of gear train units assembled with respective axles, and a common bull gear for the pair of gear train units. Each of the pair of gear train units is provided with a sun gear fixed on each of the axles, a holder relatively rotatably provided on each of the axles, and a planetary gear supported by the holder so as to mesh with the sun gear. Both of the holders integrally engage with the bull gear.

Therefore, the differential assembly can be easily assembled and disassembled. Also, it can be made so compact as to be easily assembled into the transaxle.

Moreover, a transaxle according to the present invention is comprised of a transmission, a pair of axles, a deceleration assembly for decelerating rotation outputted from the transmission, the above-mentioned differential assembly for transmitting power from the deceleration assembly to the pair of axles, and a common housing containing the transmission, the pair of axles, the deceleration assembly and the differential assembly, so as to be miniaturized.

Common fluid in the common housing is effectively used as hydraulic fluid for the transmission, and as lube for the deceleration assembly and the differential assembly.

The transaxle further comprises contacting portions formed in the housing, wherein the pair of gear train units of the differential assembly are brought into contact with the respective contacting portions so as to be located in the housing. Therefore, the unified differential assembly can be easily positioned to be assembled in the transaxle.

These, other and further objects, features and advantages of the invention will appear more fully from the following description taken in connection with the accompanying drawings.

DETAILED DESCRIPTION OF THE INVENTION

To begin with, explanation will be given of common features in a configuration of a transaxle 1 according to a first embodiment illustrated in FIGS. 1 to 4 and a second embodiment illustrated in FIGS. 5 to 8.

Figure 1:
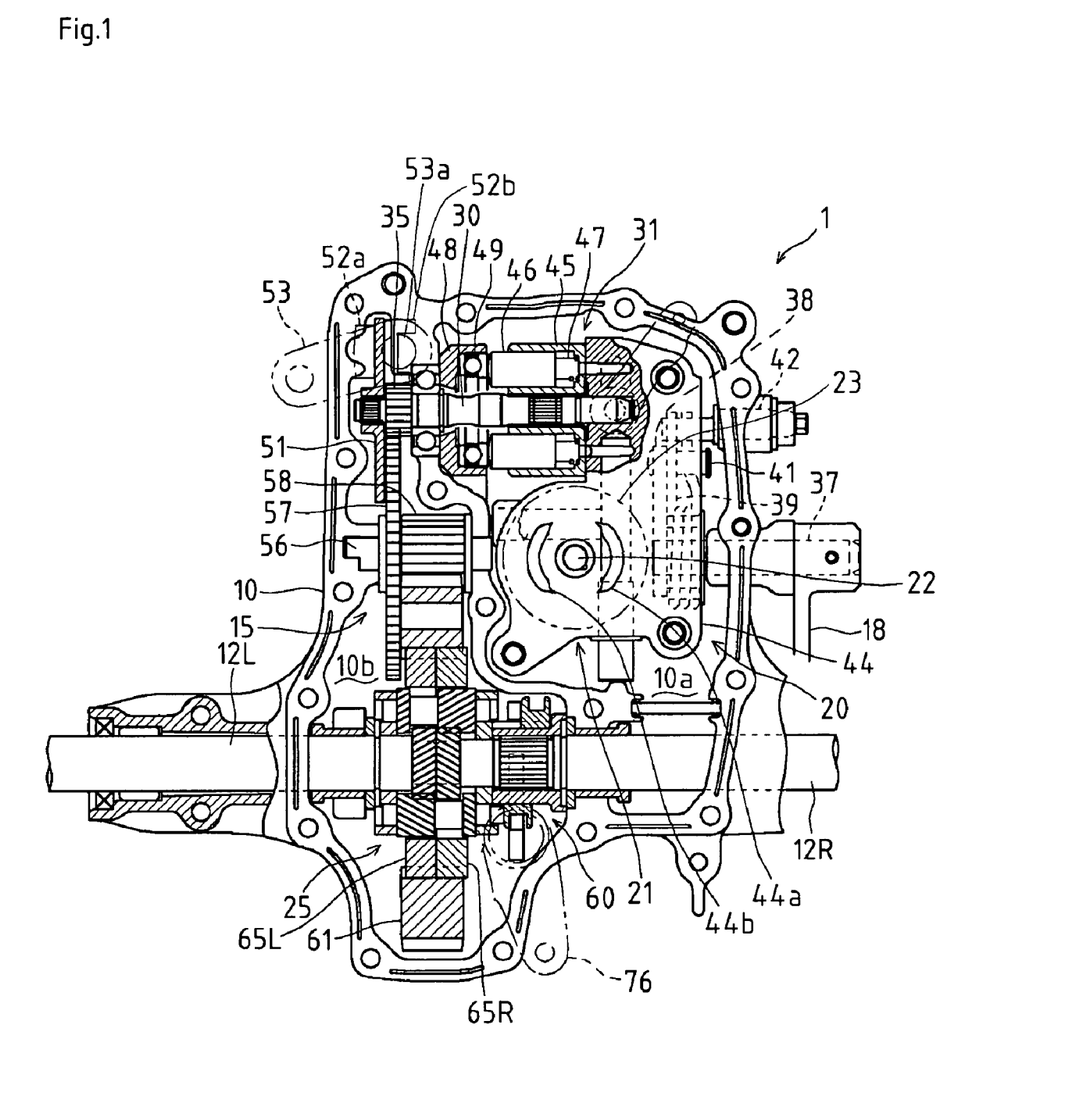
FIG. 1 is a plan view of a transaxle equipped with a differential assembly according to a first embodiment of the present invention, from which an upper distributor body of a housing and a hydraulic pump are removed.
Figure 5:
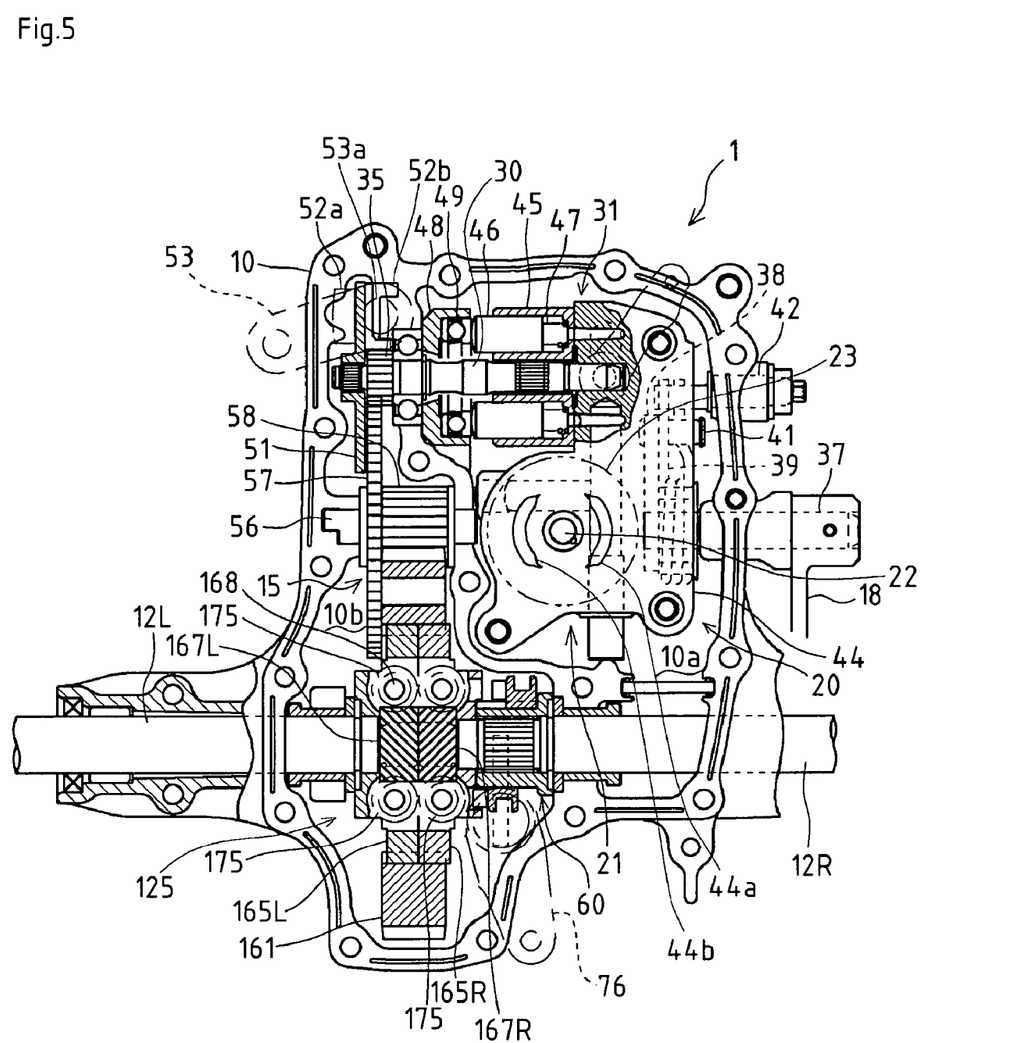
FIG. 5 is a plan view of a transaxle equipped with a differential assembly according to a second embodiment of the present invention, from which an upper distributor body of a housing and a hydraulic pump are removed.

Referring to FIG. 1 or 5, the transaxle 1 has a housing 10 vertically dividable through a horizontal surface. In the common housing 10 are disposed an HST (hydrostatic transmission) 20 serving as a transmission, a differential assembly 25 or 125 differentially connecting left and right axles 12L and 12R, and a deceleration assembly 15 drivingly interposed between the HST 20 and the differential assembly 25 or 125. The left and right axles 12L and 12R project laterally oppositely from the housing 10 to be provided on their distal ends with respective drive wheels (not shown).

In the housing 10 are formed a first chamber 10a, in which the HST 20 is disposed, and a second chamber 10b, in which the deceleration assembly 15 and the differential assembly 25 or 125 are disposed. The first and second chambers 10a and 10b are mutually fluidly open for free passage, and full of common fluid used as lube and hydraulic fluid for the HST 20, the deceleration assembly 15, and the differential assembly 25 or 125.

The HST 20 comprises a center section 44 onto which a hydraulic pump 21 having a vertical rotary axis and a hydraulic motor 31 having a horizontal rotary axis in parallel to the axles 12L and 12R are mounted so as to be mutually fluidly connected.

The hydraulic motor 31 comprises a cylinder block 45 slidably and rotatably fitted onto a vertical motor mounting surface of the center section 44. Pistons 46 are reciprocally fitted into respective cylindrical bores in the cylinder block 45 through respective energization springs 47. A thrust bearing 49 of a swash plate 48 contacts heads of the pistons 46. The swash plate 48 and the thrust bearing 49 are bored together by a central hole through which a horizontal motor shaft 30 serving as the rotary axis of the hydraulic motor 31 is passed.

The hydraulic pump 21 is arranged between the hydraulic motor 31 and the axles 12L and 12R. A pair of kidney shaped ports 44a and 44b are bored in the center section 44 and open upward in a horizontal pump mounting surface of the center section 44 so as to be connected to cylindrical bores in a cylinder block 23 of the hydraulic pump 21 slidably and rotatably fitted on the pump mounting surface. Pistons are reciprocally fitted into the cylindrical bores in the cylinder block 23 of the hydraulic pump 21 on biasing springs, respectively, and heads of the pistons contact a thrust bearing of a movable swash plate disposed above the cylinder block 23. A vertical pump shaft 22 serving as the rotary axis of the hydraulic pump 21 projects upward from the cylinder block 23 to be passed through the movable swash plate and the thrust bearing so as to be driven by an engine or another prime mover outside the housing 10.

A pump control shaft 37 is rotatably supported by the housing 10. In the housing 10, an arm 38 is fixed to the shaft 37 and engages with a side of the movable swash plate of the hydraulic pump 21. The shaft 37 projects outward from the housing 10 to be fixed to a pump control lever 18.

The lever 18 is turned to rotate the pump control shaft 37 so as to adjust the tilt angle of the swash plate of the hydraulic pump 21, thereby adjusting the quantity and direction of fluid delivered from the hydraulic pump 21 for determining the traveling speed and direction of the vehicle.

A neutral return spring 39 is wound around the control shaft 37 so as to automatically return the movable swash plate to a neutral position for delivering no fluid from the hydraulic pump 21 when the movable swash plate is released from an operational force. The ends of the spring 39 are crossed and extended in parallel so as to clamp a movable pin 41 and a fixed pin 42. The movable pin 41 is fixed to the pump control arm 38 so as to be movable together with the movable swash plate. The fixed pin 42 is planted through a wall of the housing 10. The fixed pin 42 has a first portion clamped by the spring 39 and a second portion screwed into the wall of the housing 10. The first portion is eccentric to the second portion so as to be revolved around the second portion by rotating the second portion outside the housing 10, thereby adjusting the neutral position of the movable swash plate relative to the pump control shaft 38.

In this embodiment, the neutral returning and adjusting mechanism of the movable swash plate, constituted by the spring 39, the pins 41 and 42, etc., is disposed around the control shaft 37 in the housing 10. Alternatively, such mechanism may be disposed around the control shaft 37 outside the housing 10.

The motor shaft 30 projects into the second chamber 10b of the housing 10 to carry a fixed gear 35 and a spline-fitted brake disk 51. The brake disk 51 is disposed between a pressure member 52a and a brake pad 52b. A vertical camshaft 53a is disposed adjacent to the brake pad 52b in the housing 10 and fixedly provided thereon with a brake control lever 53 outside the housing 10. By turning the lever 53 for braking, the camshaft 53a is rotated so as to press the brake disk 51 between the pressure member 52a and brake pad 52b, thereby braking the motor shaft 30.

In this embodiment, both of the hydraulic pump 21 and motor 31 are disposed in the housing 10. Alternatively, one of the hydraulic pump 21 and motor 31 may be disposed outside the housing 10 and fluidly connected to the other motor 31 or pump 21 in the housing 10 through piping or by another means.

In the second chamber 10b, the deceleration assembly 15 is configured to include a counter shaft 56 in parallel to the axles 12L and 12R. The counter shaft 56 carries a diametrically large gear 57 and a diametrically small gear 58 fixed to each other. The large gear 57 constantly meshes with the gear 35 fixed on the motor shaft 30. The small gear 58 constantly meshes with a bull gear 61 of the differential assembly 25 or a bull gear 161 of the differential assembly 125. Such a deceleration assembly 15 transmits the torque of the motor shaft 30 to the differential assembly 25 or 125.

Figure 4:
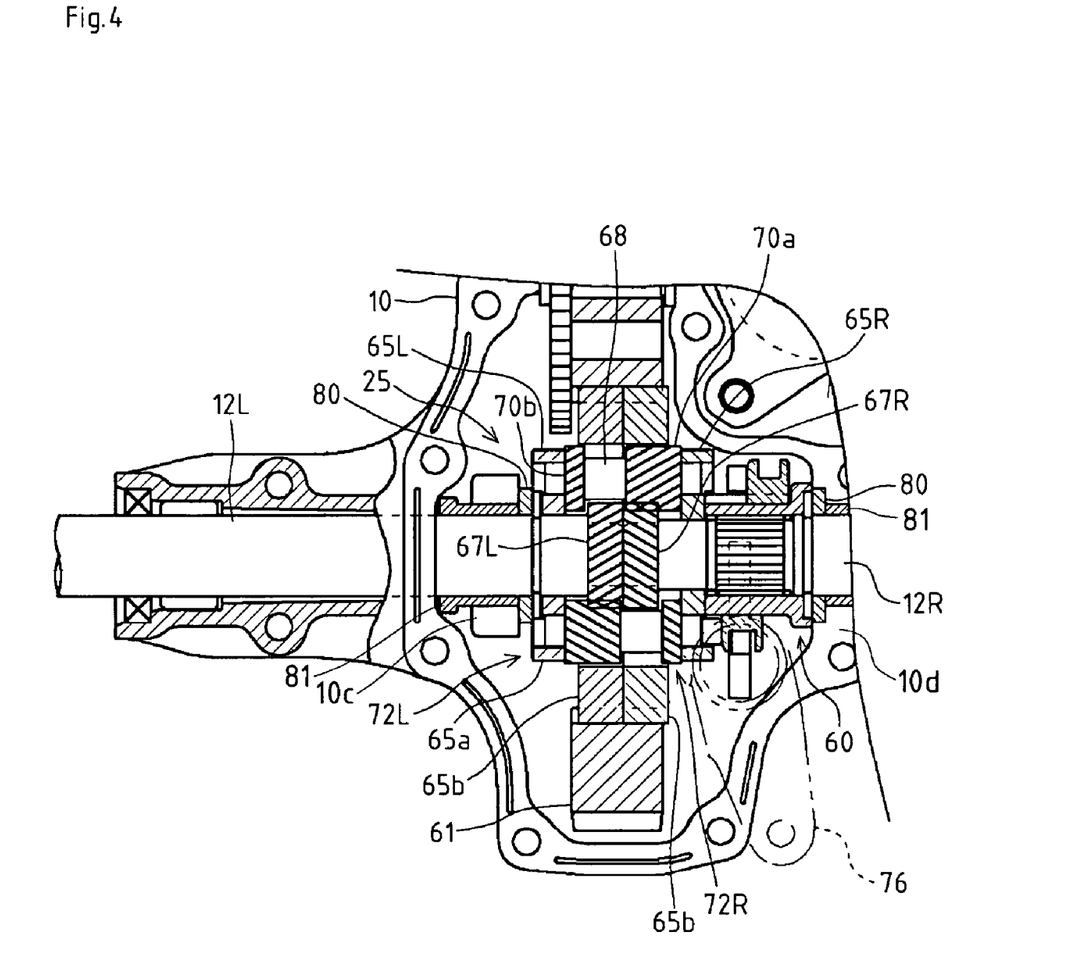
FIG. 4 is an enlarged plan view of the differential assembly in the transaxle.
Figure 8:
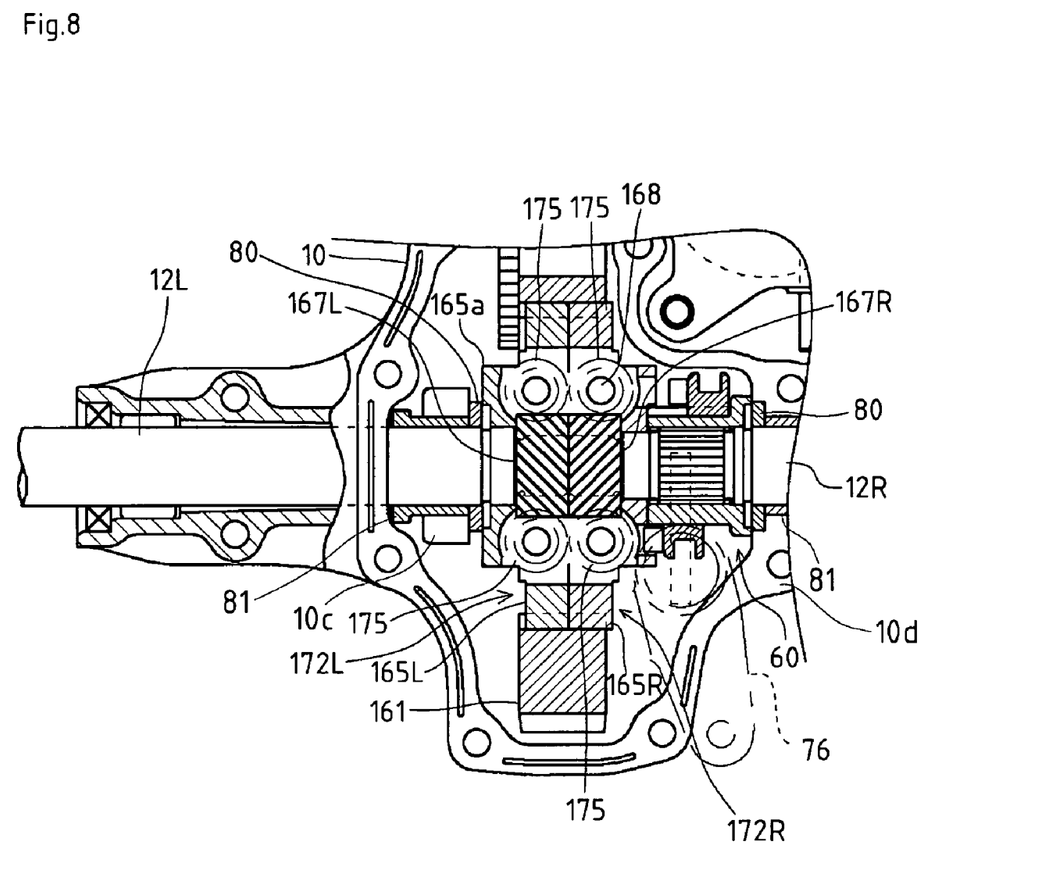
FIG. 8 is an enlarged plan view of the differential assembly in the transaxle.

As shown in FIG. 4 or 8, on the left side of the differential assembly 25 or 125, an axle support portion 10c having an upwardly open semicircular recess projects upward from the bottom surface of the housing 10. On the right side of the differential assembly 25 or 125, a partition wall of the housing 10 between the first and second chambers 10a and 10b is partly formed into an axle support portion 10d having an upwardly open semicircular recess. The left axle 12L is rotatably supported in the recess of the axle support portion 10c through a bearing sleeve 81, and the right axle 12R in the recess of the axle support portion 10d through another bearing sleeve 81. The upper distributor body (not shown) of the housing 10 has left and right axle support portions having respective downward open semicircular recesses similar to the portions 10c and 10d, so that, when the housing 10 is assembled by joining the upper and lower distributor bodies thereof, the upper and lower axle support portions contact each other and their semicircular recesses are joined to form perfect circular holes, in which the respective axles 12L and 12R are rotatably supported through the respective bearing sleeves 81.

Between the left and right axle support portions 10c and 10d, i.e., between the left and right bearing sleeves 81 are disposed the differential assembly 25 or 125 and the differential lock assembly 60 on one (in these embodiments, right) side of the differential assembly 25 or 125. A retaining ring 80 is sandwiched between the left end of the differential assembly 25 or 125 and the bearing sleeve 81 held in the left axle support portion 10c on the left axle 12L. Another retaining ring 80 is disposed on the left end of the right axle support portion 10d on the right axle 12R between the right end of the differential lock assembly 60 and the bearing sleeve 81. In this way, the left and right retaining rings 80 contact the left and right ends of the differential assembly 25 or 125 so as to fix the position of the differential assembly 25 or 125 in the housing 10.

The differential lock assembly 60 on one side of the differential assembly 25 or 125 is provided for locking the left and right axles 12L and 12R to each other. In these embodiments, the differential lock assembly 60 is disposed on the right axle 12R on the right side of the differential assembly 25 or 125. The differential lock assembly 60 is operatively connected to a differential lock operation lever 76 outside the housing 10. If one of right and left drive wheels on respective axles 12L and 12R is mired in a ditch, for example, the drive wheel in the ditch receives almost all of the output power from the HST 20, and rotates freely, and the drive wheel outside of the ditch does not receive power from the HST 20 and therefore is not rotated. The operation lever 76 is operated so as to actuate the differential lock assembly 60 to cancel the differential rotation of the axles 12L and 12R, whereby the output power of HST 20 is substantially evenly distributed between both of the drive wheels so that the mired drive wheel can escape from the ditch.

Each of the differential assemblies 25 and 125 has a function of limiting differential rotation of the axles 12L and 12R.

The differential assembly 25 shown in FIGS. 1 to 4 will now be explained. The differential assembly 25 is provided with a holder consisting of left and right half holders 65L and 65R contacting each other through a vertical dividing surface perpendicular to the axles 12L and 12R. The half holders 65L and 65R are formed symmetrically with respect to the dividing surface, thereby facilitating their standardization. Further, they are shaped suitably for being made of sintered metal. Thus, parts used as either the half holders 65L or 65R may be made inexpensively.

Figure 2:
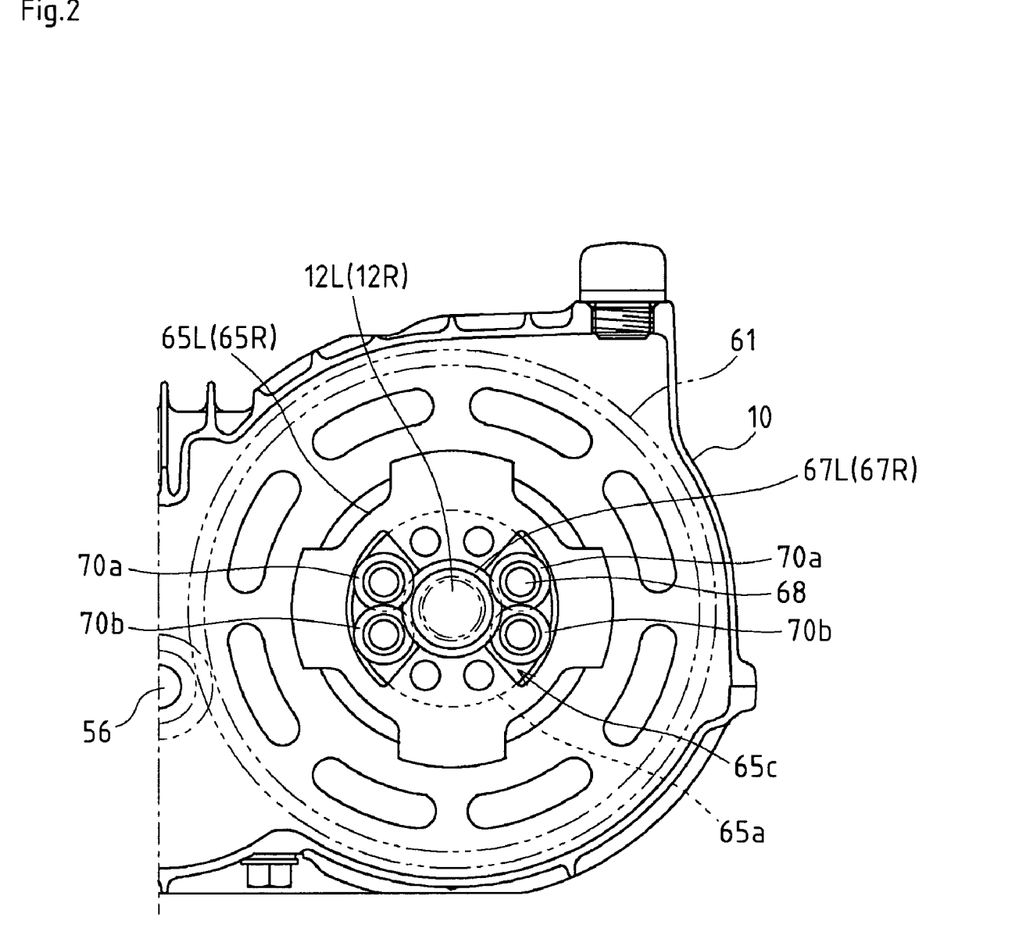
FIG. 2 is an enlarged side view of the differential assembly in the transaxle, from which a bull gear is removed.
Figure 3:
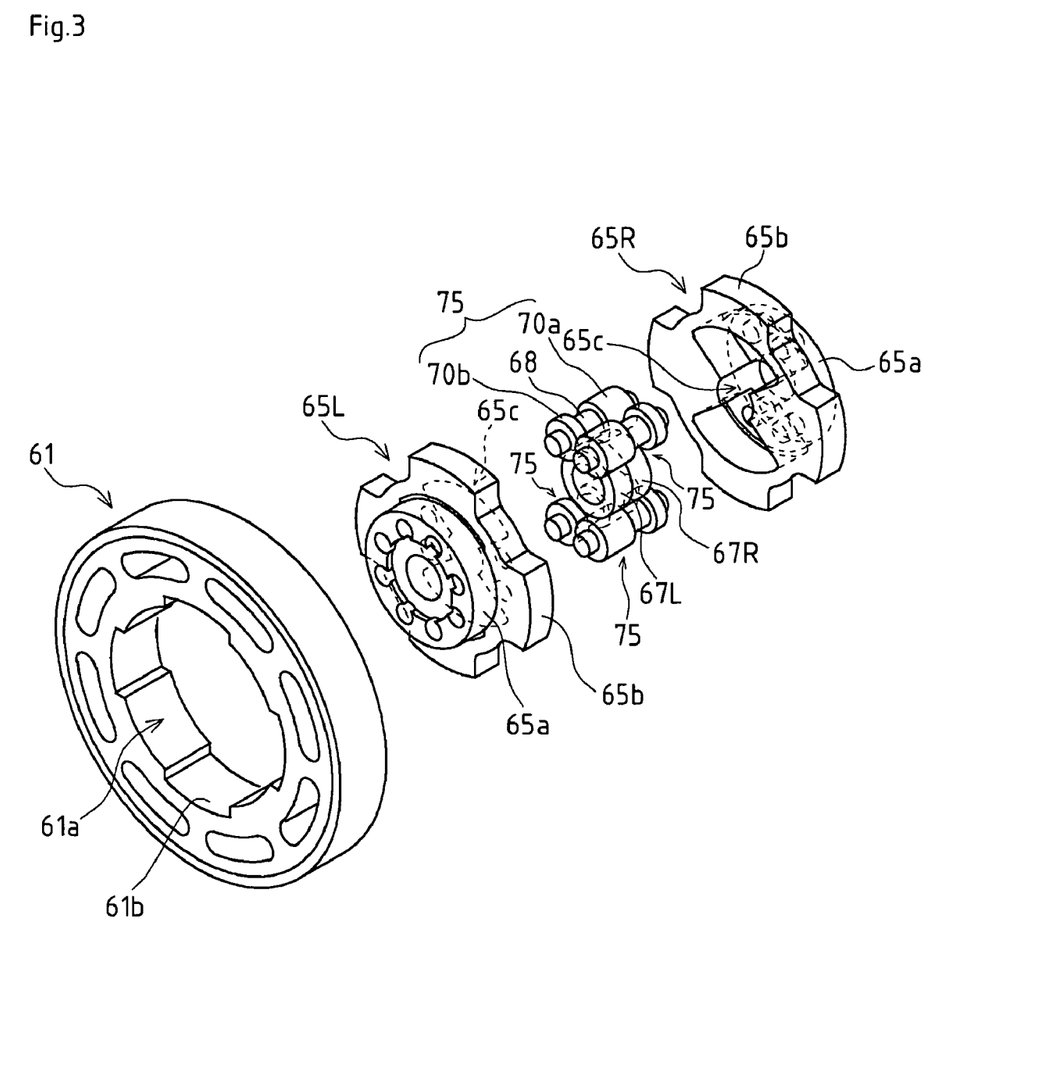
FIG. 3 is an exploded perspective view of the differential assembly while being assembled.

Referring to FIGS. 2 and 3, axial center portions 65a of the half holders 65L and 65R are oppositely expanded so as to be relatively rotatably supported on respective proximal ends of the axles 12L and 12R. Each axial center portion 65a has an axial central hole into which the axle 12L or 12R is inserted. The axial center portion 65a is provided around the axial central hole with a plurality of axial holes at regular intervals into which lock pins of the differential lock assembly 60 are inserted when differential locking. The axial holes for differential locking are also used for insertion of ends of later-discussed shafts 68 of planetary gears 75.

Each of the half holders 65L and 65R is formed on its peripheral edge with a plurality of (in this embodiment, four) radial convex projections 65b. Each of the half holders 65L and 65R is provided with a pair of deltaic openings 65c which are symmetric with respect to its central axis and open at its surface facing the other half holder 65L or 65R. The bull gear 61 has a central hole 61a formed with concave recesses 61b corresponding to the respective convex projections 65b of the half holders 65L and 65R. Both of the half holders 65L and 65R are inserted into the central hole 61a and their convex projections 65b are fitted in the respective concave recesses 61b, whereby the half holders 65L and 65R are fixed together to the bull gear 61. The perfect holder as the half holders 65L and 65R fitted in the bull gear 61 has symmetrical two holes each of which is made by the openings 65c of the half holders 65L and 65R coinciding with each other.

In the axial central holes of the half holders 65L and 65R, helical sun gears 67L and 67R are fixed on the proximal ends of the axles 12L and 12R, respectively. Four helical planetary gears 75 meshing with the respective sun gears 67L and 67R are distributed by pairs into the two holes of the assembled holder as the half holders 65L and 65R are joined. Each of the planetary gears 75 serves as a gear train between the corresponding sun gear 67L or 67R and the bull gear 61. The half holder 65L and the sun gear 67L supported on the left axle 12L, and the two planetary gears 75 meshing with the sun gear 67L constitute a left gear train unit 72L. The half holder 65R and the sun gear 67R supported on the right axle 12R, and the two planetary gears 75 meshing with the sun gear 67R constitute a right gear train unit 72R. Thus, each of the gear train units 72L and 72R is provided with two gear trains as the two planetary gears 75.

Each of the planetary gears 75 has the shaft 68 rotatably and axially slidably supported at its opposite ends by the half holders 65L and 65R. Each planetary gear 75 comprises mutually opposite long and short helical gears 70a and 70b fixed on the shaft 68. In each planetary gear 75, the long helical gear 70a disposed in one of the half holders 65L and 65R directly meshes with the sun gear 67L or 67R, and the short helical gear 70b disposed in the other half holder 65R or 65L does not mesh with the sun gear 67L or 67R but directly meshes with the long helical gear 70a of another adjacent planetary gear 75 disposed in the same hole of the perfect holder as the joined half holders 65L and 65R. Namely, in each of the two holes within the assembled holder, the two adjacent planetary gears 75 are disposed axially opposite to each other. Further, in each of the half holders 65L and 65R, the two long helical gears 70a in the respective openings 65c are disposed symmetrically with respect to the sun gear 67L or 67R meshing with them.

The two gear train units 72L and 72R, for differentially connecting the axles 12L and 12R, are combined between the half holders 65L and 65R and provided as a unit fitted in the bull gear 61 such that the gear train units 72L and 72R are not relatively rotatable. The combined gear train units 72L and 72R can be easily fitted into the bull gear 61 without bolts in the above-mentioned way. Alternatively, a bolt or another fastening member may be used for fixing them to the bull gear 61.

As shown in FIGS. 1 and 4, in the combined gear train units 72L and 72R, between the long and short helical gears 70a and 70b of each planetary gear 75 is disposed a part of either the sun gear 67L or 67R, thereby reducing the radial distance between each planetary gear 75 and the axle 12L or 12R. Furthermore, opposite end surfaces of each sun gear 67L or 67R are extremely close to proximal end surfaces of the long and short helical gears 70a and 70b of the two planetary gears 75 which do not mesh with the same sun gear 67L or 67R, and distal end surfaces of the long and short helical gears 70a and 70b of each planetary gear 75 are extremely close to inner vertical surfaces of the axial center portions 65a of the half holders 65L and 65R, thereby extremely reducing the axial length of differential assembly 25.

As mentioned above, when the gear train units 72L and 72R are assembled in the bull gear 61 on the axles 12L and 12R and assembled with the differential lock assembly 60 on the right side, the left end of the left half holder 65L contacts the left retaining ring 80, and the right end of the differential lock assembly 60 contacts the right retaining ring 80 (or the axle support portion 10d), whereby the differential assembly 25 and the differential lock assembly 60 are fixed in place in the housing 10.

In the differential assembly 25, the half holders 65L and 65R are rotated together with the bull gear 61 driven by output power of the HST 20 through the deceleration assembly 15. If the drive wheels on the respective axles 12L and 12R are evenly loaded and driving power is evenly distributed between the drive wheels, the planetary gears 75 revolve around the sun gears 67L and 67R without rotating relative to the half holders 65L and 65R, thereby evenly driving the sun gears 67L and 67R, i.e., the axles 12L and 12R.

It is now assumed that the axles 12L and 12R are going to rotate differentially because one of the drive wheels on the axles 12L and 12R is mired in a ditch or soft ground. In this situation, a differential pinion is going to rotate relative to a bull gear. If a normal differential assembly which does not limit differential rotation of axles were used, the rotation of differential pinion relative to the bull gear would be substantially freely allowed so that the mired drive wheel receives substantially the entire output power from the bull gear, and the other grounding drive wheel receives almost no driving power, whereby a vehicle cannot move.

However, in the differential assembly 25, each of the helical planetary gears 75 meshing with the helical sun gear 67L or 67R creates an axial torque bias while it rotates relative to the assembled holder (joined half holders 65L and 65R) because of differential rotation of the axles 12L and 12R. In detail, in each of the two deltaic holes in the assembled holder, the mutually meshing planetary gears 75 cause axial torque biases in opposite directions so as to slide their shafts 68 in their axial directions, whereby the long and short helical gears 70a and 70b abut at their distal end surfaces against the left and right vertical end surfaces of half holders 65L and 65R, and at their proximal end surfaces against the sun gears 67L and 67R, thereby generating frictional resistance against the rotation of planetary gears 75 relative to the holder. Thus, the differential rotation of the sun gears 67L and 67R, i.e., the axles 12L and 12R is limited. While one of the drive wheels on the axles 12L and 12R is mired, the other drive wheel receives driving power of the bull gear 61 to some degree because of the limited differential rotation of the axles 12L and 12R, whereby a vehicle can travel and escape. If the driving power received by the non-mired drive wheel is insufficient, the differential lock system 60 may be operated.

Explanation will now be given of the differential assembly 125, shown in FIGS. 5 to 8, having the function of limiting differential rotation of the axles 12L and 12R.

The differential assembly 125 is provided with a holder consisting of left and right half holders 165L and 165R contacting a vertical dividing surface perpendicular to the axles 12L and 12R. The half holders 165L and 165R are formed symmetrically with respect to the dividing surface, thereby facilitating their standardization.

Figure 6:
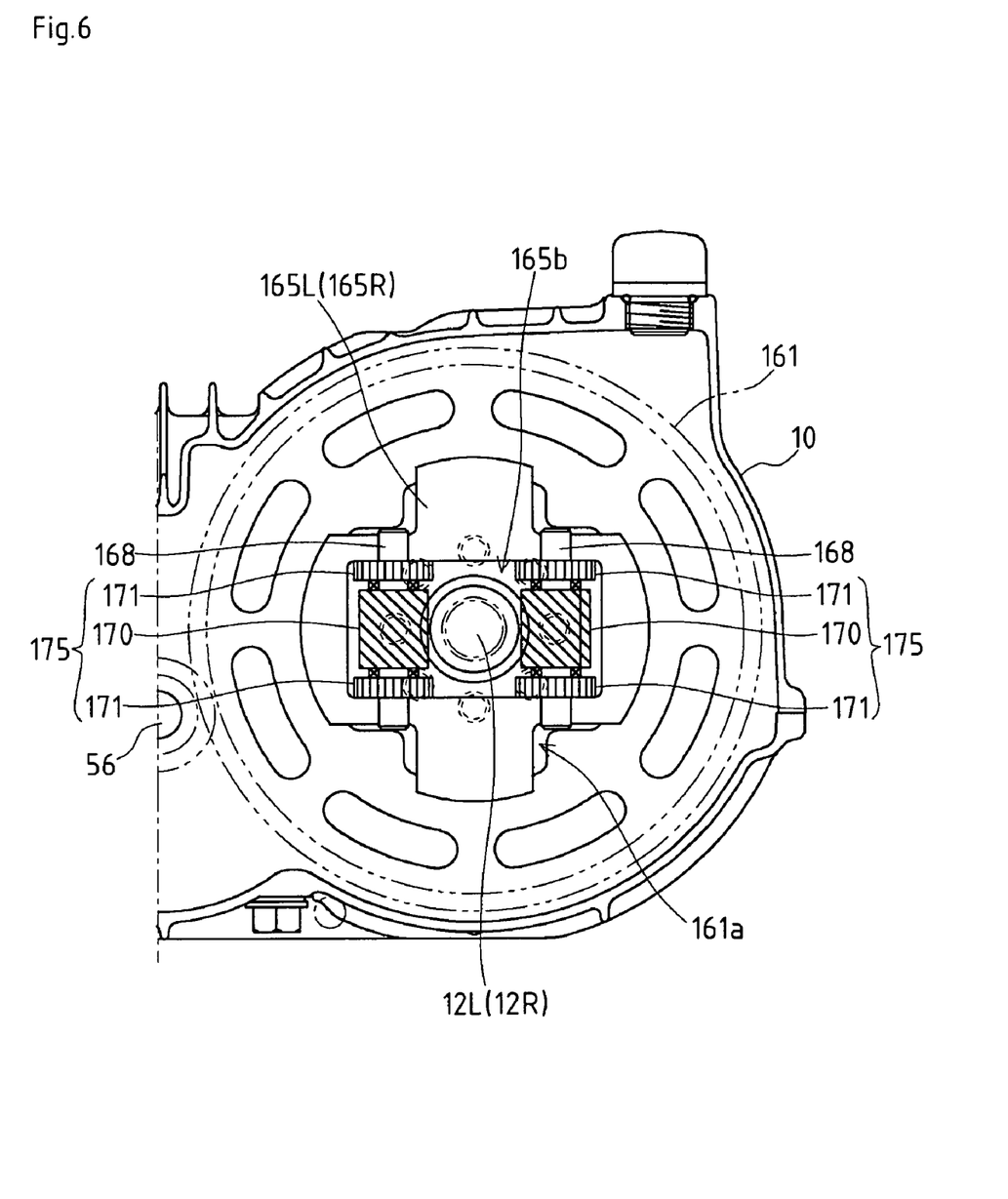
FIG. 6 is an enlarged side view of the differential assembly in the transaxle, from which a bull gear is removed.
Figure 7:
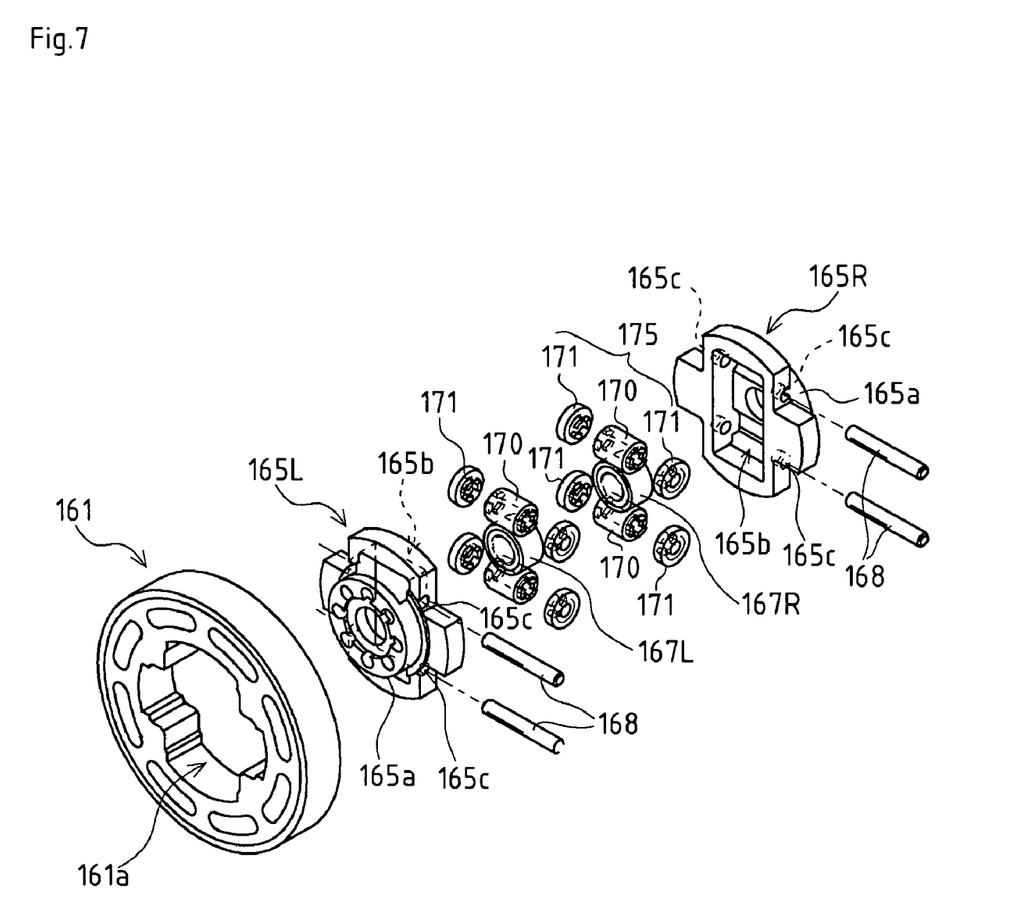
FIG. 7 is an exploded perspective view of the differential assembly while being assembled.

Referring to FIGS. 6 and 7, axial center portions 165a of the half holders 165L and 165R are oppositely expanded so as to be relatively rotatably supported on respective proximal ends of the axles 12L and 12R. Each axial center portion 165a has an axial central hole into which the axle 12L or 12R is inserted. The axial center portion 165a of right half holder 165R is further provided around the axial central hole with a plurality of axial holes at regular intervals into which lock pins of the differential lock assembly 60 are inserted when differential locking. The holes for differential locking need not be provided in the left half holder 165L, however, they may be provided therein so as to standardize the left and right half holders 165L and 165R.

A portion of each of the half holders 165L and 165R is cross-shaped around the axial center portion 165a when axially viewed. The bull gear 161 has a cross-shaped central hole 161a corresponding to the cross-shaped half holders 165L and 165R. Both of the half holders 165L and 165R are fittingly inserted into the central hole 161a, whereby the half holders 165L and 165R are fixed together to the bull gear 161.

Each of the half holders 165L and 165R has a rectangular opening 165b, as shown in FIG. 6. The assembled holder (i.e., when the half holders 165L and 165R are fitted in the bull gear 161) has a single hole made by the openings 165b of the half holders 165L and 165R coinciding with each other. In the rectangular opening 165b of each of the half holders 165L and 165R, each of worm wheels 167L and 167R serving as sun gears is fixed on the proximal end of each axle 12L or 12R, and two planetary gears 175 are disposed symmetrically with respect to the worm wheel 167L or 167R. Each planetary gear 175 serves as a gear train between the corresponding worm wheel 67L or 67R and the bull gear 161. The half holder 165L and the worm wheel 167L supported on the left axle 12L, and the two planetary gears 175 meshing with the worm wheel 167L constitute a left gear train unit 172L. The half holder 165R and the worm wheel 167R supported on the right axle 12R, and the two planetary gears 175 meshing with the worm wheel 167R constitute a right gear train unit 172R. Thus, each of the gear train units 172L and 172R is provided with two gear trains as the two planetary gears 175.

The four planetary gears 175 have parallel shafts 168, each of which is rotatably supported at its opposite ends by one of the half holders 165L and 165R. The two parallel shafts 168 in each half holder 165L or 165R are disposed symmetrically with respect to the corresponding worm wheel 167L or 167R perpendicularly to the rotary axis of the axles 12L and 12R. Further, the four shafts 168 in the assembled holder (i.e., the joined half holders 165L and 165R) are distributed into two sets of parallel shafts 168 aligned in parallel to the rotary axis of the axles 12L and 12R.

Each planetary gear 175 comprises two spur gears 171 and a pinion worm 170 between the spur gears 171, all of which are fixed on the shaft 168. The pinion worm 170 directly meshes with the corresponding worm wheel 167L or 167R. The spur gears 171 are aligned in parallel to the rotary axis of the axles 12L and 12R between the half holders 165L and 165R and the left and right parallel shafts 168. The spur gears 171 on one shaft 168 directly mesh with the spur gears 171 on the adjacent shaft 168, whereby the left planetary gears 175 in the half holder 165L mesh with the right planetary gears 175 in the half holder 165R. Namely, the left and right gear train units 172L and 172R are drivingly connected to each other through the spur gears 171.

The two gear train units 172L and 172R, for differentially connecting the axles 12L and 12R, are combined between the half holders 165L and 165R and provided as a unit fitted in the bull gear 161 such that the gear train units 172L and 172R are not relatively rotatable. The combined gear train units 172L and 172R can be easily fitted into the bull gear 161 without bolts in the above-mentioned way. Alternatively, a bolt or another fastening member may be used for fixing them to the bull gear 161.

As mentioned above, when the gear train units 172L and 172R are assembled in the bull gear 161 on the axles 12L and 12R and assembled with the differential lock assembly 60 on the right side, the left end of the left half holder 165L contacts the left retaining ring 80, and the right end of the differential lock assembly 60 contacts the right retaining ring 80 (or the axle support portion 10d), whereby the differential assembly 125 and the differential lock assembly 60 are fixed in place in the housing 10.

In the differential assembly 125, the half holders 165L and 165R are rotated together with the bull gear 161 driven by output power of the HST 20 through the deceleration assembly 15. If the drive wheels on the respective axles 12L and 12R are evenly loaded and driving power is evenly distributed between the drive wheels, the planetary gears 175 revolve around the worm wheels 167L and 167R as sun gears without rotating relative to the holders 165L and 165R, thereby evenly driving the worm wheels 167L and 167R, i.e., the axles 12L and 12R.

It is now assumed that the axles 12L and 12R are going to rotate differentially for any reason, for example, because one of the drive wheels on the axles 12L and 12R is mired in a ditch or soft ground. In this situation, the meshing spur gears 171 are going to transmit power between the left gear train unit 172L and the right gear train unit 172R. However, the friction force between the meshing worm wheel 167L or 167R and each pinion worm 170 is so large as to resist the differential transmission of force between the gear train units 172L and 172R, i.e., between the axles 12L and 12R. In this way, the differential assembly 125 has the function of limiting differential rotation of the axles 12L and 12R.

It is further understood by those skilled in the art that the foregoing description is a preferred embodiment of the disclosed device and that various changes and modifications may be made in the invention without departing from the spirit and scope thereof.

What is claimed is:

1. A differential assembly comprising:
   a pair of coaxial axles;
   a pair of gear train units disposed on the respective axles, each of the gear train units including
      a sun gear fixed on each of the axles,
      a holder relatively rotatably supported on each of the axles, and
      a planetary gear supported by the holder to mesh with the sun gear; and
   a common bull gear integrally engaging with a projection formed on each of the holders of the pair of gear train units, wherein the gear has a hole into which the projections are inserted.

2. The differential assembly according to claim 1, wherein the holders of the pair of gear train units are joined to each other through a surface perpendicular to the pair of axles.

3. The differential assembly according to claim 2, wherein the holders are symmetrical with respect to the surface.

4. The differential assembly according to claim 1, wherein the holders are made of sintered metal.

5. The differential assembly according to claim 1, wherein the planetary gears of the pair of gear train units are drivingly connected to each other.

6. The differential assembly according to claim 5, wherein each of the planetary gears of the gear train units has an integrally rotatable coaxial transmission gear so that the transmission gears of the gear train units mesh with each other.

7. The differential assembly according to claim 5, wherein power transmission between the gear train units is resisted so as to limit differential rotation of the axles.

8. The differential assembly according to claim 7, wherein the sun gears and the planetary gears of the pair of gear train units are helical gears, wherein the helical planetary gears are axially movably supported, and wherein, when differential torque is generated between the axles, each of the helical planetary gears axially moves so as to frictionally abut against another member.

9. The differential assembly according to claim 8, wherein the member to frictionally abut against the axially moved helical planetary gear is the holder.

10. The differential assembly according to claim 8, wherein each of the planetary gears has a rotary axis parallel to the axles.

11. The differential assembly according to claim 10, wherein a shaft serving as the rotary axis of each of the planetary gears is axially movably supported at opposite ends thereof by the pair of holders.

12. The differential assembly according to claim 7, wherein each of the sun gears is a worm wheel, and wherein each of the planetary gears is a worm pinion.

13. The differential assembly according to claim 12, wherein each of the worm pinions serving as the planetary gears has a rotary axis perpendicular to the axles.

14. The differential assembly according to claim 13, wherein a shaft serving as the rotary axis of each of the planetary gears is supported by each of the holders.

15. A differential assembly, comprising:
   a pair of coaxial axles;
   a bull gear receiving output of the deceleration assembly, the bull gear being relatively rotatably supported around the axles, and
   a pair of gear trains, each of which drivingly connects the bull gear to each of the axles, wherein the pair of gear trains are drivingly connected to each other so that power transmission between the gear trains is restricted, each of the gear trains of the differential assembly including:
      a sun gear fixed on each of the axles, the pair of sun gears being disposed in the bull gear; and
      a planetary gear supported by the bull gear so as to mesh with the sun gear, wherein the planetary gears of the pair of gear trains are drivingly connected to each other so that power transmission between the planetary gears is restricted, wherein the sun gears and the planetary gears are helical gears, wherein the helical planetary gears are axially movably supported, and wherein, when differential torque is generated between the axles, each of the helical planetary gears axially moves so as to frictionally abut against another member.

16. The differential assembly according to claim 15, wherein each of the planetary gears has an integrally rotatable coaxial transmission gear so that the transmission gears of the planetary gears mesh with each other.

17. The differential assembly according to claim 15, wherein each of the planetary gears has a rotary axis parallel to the axles.

18. The differential assembly according to claim 15, each of the gear trains of the differential assembly further comprising:
   a holder relatively rotatably provided on each of the axles, wherein the holders of the pair of gear trains integrally engage with the common bull gear.

19. The differential assembly according to claim 18, wherein the holders of the pair of gear train units are joined to each other through a surface perpendicular to the pair of axles.

20. The differential assembly according to claim 19, wherein the holders are symmetrical with respect to the surface.

21. The differential assembly according to claim 18, wherein the holders are made of sintered metal.

22. The differential assembly according to claim 18, wherein the helical planetary gears has a shaft which is disposed in parallel to the axles and axially movably supported at opposite ends thereof by the pair of holders.

23. The differential assembly according to claim 22, wherein the member to frictionally abut against the axially moved planetary gear is the holder.

24. The differential assembly according to claim 18, wherein the bull gear has a central hole, in which the holders of the pair of gear trains are integrally fitted, and a toothed outer-peripheral edge for receiving output rotation of a deceleration assembly.

* * * * *